US008533486B1

(12) United States Patent
Stark et al.

(10) Patent No.: US 8,533,486 B1
(45) Date of Patent: Sep. 10, 2013

(54) INCORPORATING FALSE REJECT DATA INTO A TEMPLATE FOR USER AUTHENTICATION

(75) Inventors: Yvonne J. Stark, North Bend, WA (US); Mechthild R. Kellas-Dicks, Coquitlam (CA)

(73) Assignee: Scout Analytics, Inc., Issaquah, WA (US)

( * ) Notice: Subject to any disclaimer, the term of this patent is extended or adjusted under 35 U.S.C. 154(b) by 349 days.

(21) Appl. No.: 12/365,103

(22) Filed: Feb. 3, 2009

(51) Int. Cl.
H04L 29/06 (2006.01)

(52) U.S. Cl.
USPC .................... 713/186; 726/2; 726/28

(58) Field of Classification Search
None
See application file for complete search history.

(56) References Cited

U.S. PATENT DOCUMENTS

| 6,311,272 B1 * | 10/2001 | Gressel | 713/186 |
| 6,938,159 B1 * | 8/2005 | O'Connor et al. | 713/186 |
| 7,509,686 B2 * | 3/2009 | Checco | 726/27 |
| 7,797,549 B2 * | 9/2010 | Main et al. | 713/186 |
| 2007/0236330 A1 * | 10/2007 | Cho et al. | 340/5.54 |
| 2008/0037832 A1 * | 2/2008 | Phoha | 382/115 |
| 2009/0150992 A1 * | 6/2009 | Kellas-Dicks et al. | 726/19 |
| 2009/0240949 A9 * | 9/2009 | Kitchens et al. | 713/183 |

OTHER PUBLICATIONS

J.-W. Lee, S.-S. Choi, and B.-R. Moon, "An evolutionary keystroke authentication based on ellipsoidal hypothesis space," in GECCO '07: Proceedings of the 9th annual conference on Genetic and evolutionary computation. New York, NY, USA: ACM, 2007, pp. 2090-2097.*

Pin Shen Teh, Andrew Beng Jin Teoh, Thian Song Ong, and Han Foon Neo. 2007. Statistical Fusion Approach on Keystroke Dynamics. In Proceedings of the 2007 Third International IEEE Conference on Signal-Image Technologies and Internet-Based System (SITIS '07). IEEE Computer Society, Washington, DC, USA, 918-923. DOI=10.1109/SITIS.2007.46 http://dx.doi.*

* cited by examiner

Primary Examiner — Jeffery Williams
(74) Attorney, Agent, or Firm — Blakely, Sokoloff, Taylor & Zafman LLP (57) ABSTRACT

Access to a resource may be denied in response to a score value being below a threshold value. The score value may be based on timing information of key-press and key-release events. After denying access to the resource, the timing information of key-press and key-release events may be incorporated into the keystroke dynamics template.

23 Claims, 5 Drawing Sheets

INCORPORATING FALSE REJECT DATA INTO A TEMPLATE FOR USER AUTHENTICATION

FIELD

Keystroke dynamics authentication.

BACKGROUND

Authentication systems protect resources, such as documents and data, and accurately identify the creator of the resource. For example, a message (i.e., a written instrument or electronic document) created by an individual can be marked by a handwritten signature, sealed by a physical seal, or protected by a password or a personal identification number (PIN) in order to identify the author of the message or control access to its contents. In some electronic or computer systems, the signature, PIN or password of the message creator is stored in a central memory or in storage media that is part of the computer system. When a user desires to read the protected message, the user enters the appropriate signature, password or PIN using an input device. The computer system compares the signature, password or PIN that is entered using the input device with the stored signature, password or PIN associated with the message to be accessed and determines whether to allow the message to be displayed or accessed.

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

Various approaches have been tried to improve the security of computer systems including authentication systems that rely on unique physical characteristics of users to identify authorized users. For example, fingerprints, voice patterns and retinal images have all been used with some success. However, these systems usually require special hardware to implement (e.g. fingerprint or retinal cameras; audio input facilities). Therefore, there is a need for an authentication process that uses unique physical characteristics of users without requiring special hardware.

SUMMARY OF THE DESCRIPTION

Embodiments collect keystroke timing information as a user types on an input device. A biometric template may be created based on the collected keystroke timing information. As part of an authentication process, a score value may be calculated from collected keystroke timing information in comparison with the biometric template to authenticate the user. In the case of a false reject for the user, the collected keystroke timing information may be incorporated into the template to provide improvements with authentication of the user.

BRIEF DESCRIPTION OF THE DRAWINGS

The present invention is illustrated by way of example and not limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments.

Biometric authentication may authorize users to access a resource such as a document or device based on the user input patterns. For example, the user input pattern may include timing information of key-press and key-release events detected during entry of a phrase in which the user inputs a password or other phrases. The user may use any input device including a keyboard, touch pad, touch screen, mobile device, or PDA to input the phrase. The phrase may include a user name and password. This process may not require complicated physical characteristic recognition systems and provides a cost effective and strong secure authentication process and may not entirely rely on the content of the password or secured information.

A process to implement this authentication process based on user input patterns is to collect user input samples. To create a biometric template for authenticating a user based on physical and behavioral characteristics, user samples may be categorized. A measurement of such physical and behavioral characteristics may be referred to as the biometric measurements. For example, when a user enters a password, the time duration between keystrokes as the user types the password can be construed as a biometric measurement. For the purpose of this application, biometric measurements and raw samples (e.g. raw data sample, input data, etc.) will be used interchangeably.

Because biometric measurements rely on a user's physical and behavioral characteristics rather than the secrecy of a passphrase, the passphrase is no longer required to remain secretive. When a user is authenticated via a biometric security system, the user's physical and behavioral characteristics are measured (e.g., based on the input sample with keystroke timing information) and compared with a predetermined template (e.g., containing keystroke timing information). If there is a match, the user is authenticated. In the process of forming the template, the user may be required to enter multiple samples. By processing through an engine, these multiple samples will be transformed into a biometric template.

Variations may occur when a user enters multiple samples. For example, the timing when the user enters a first password may differ from the timing when the user enters a second password. Therefore, it is important to categorize these variations of samples and eliminate outliers. In eliminating outliers, a category of samples which best represents the physical and behavioral characteristics of the user may be found.

The category that best represents the physical/behavior characteristics may be used to create a biometric template for future authentication purpose. What is needed is an efficient process to categorize these raw samples so the accuracy when authenticating a user based on the template may be improved.

The problem of comparing a biometric sample to a template or reference sample to determine whether the samples describe the same person is a difficult one. Improved algorithms to validate biometric samples may be useful in producing more accurate identifications with reduced false acceptance rates and false reject rates.

Collection of Biometric Data

A biometric template serves as the foundation for authenticating a user. The biometric template is prepared after completing an enrollment process that collects biometric data from the user's input based on key-press and key release event data on a keyboard. In one embodiment, the enrollment process may be implemented as a gradual process in a sense that the user input data is cumulatively collected until a satisfactory amount of collected samples is met to produce a template for the user. For example, a user's input data may be collected in several distinct instances to collect sufficient biometric data that produces a biometric template. In this manner, a user may be authenticated by using the template in comparison with future user input data. For example, a user may type in a ID and pass phrase on a keyboard as part of an authentication process. Data including timing information based on the user's typing rhythm may then be extracted and compared against the template corresponding to the user. The user's typing rhythm may be based on timing information measuring key dwell times and key flight times. If the data related to the user's typing rhythm is found to be a suitably similar to the data found in the template, the user may then be successfully authenticated.

However, there are instances when the user may be falsely rejected because of an unreliable template or extraneous conditions that impact the input data. For example, extraneous conditions that could derail a positive authentication of the user may include situations where the user is experiencing a high level of stress. A user under an abnormal degree of stress could exhibit physiological changes that would modify the user's typical rhythm under normal circumstances. The user may also be recovering from a physical injury or afflicted with a physical disability that would drastically change the user's typing rhythm. Further, differences in keyboard devices may introduce timing delays that contribute to an authentication error. In these instances, it may be desirable to include the user input data into the template to recognize the user's input. Therefore, a process is needed to account for such occurrences of falsely rejecting the user so that biometric authentication based on the template is improved.

Authentication Based on Collected Biometric Data

Figure 1:
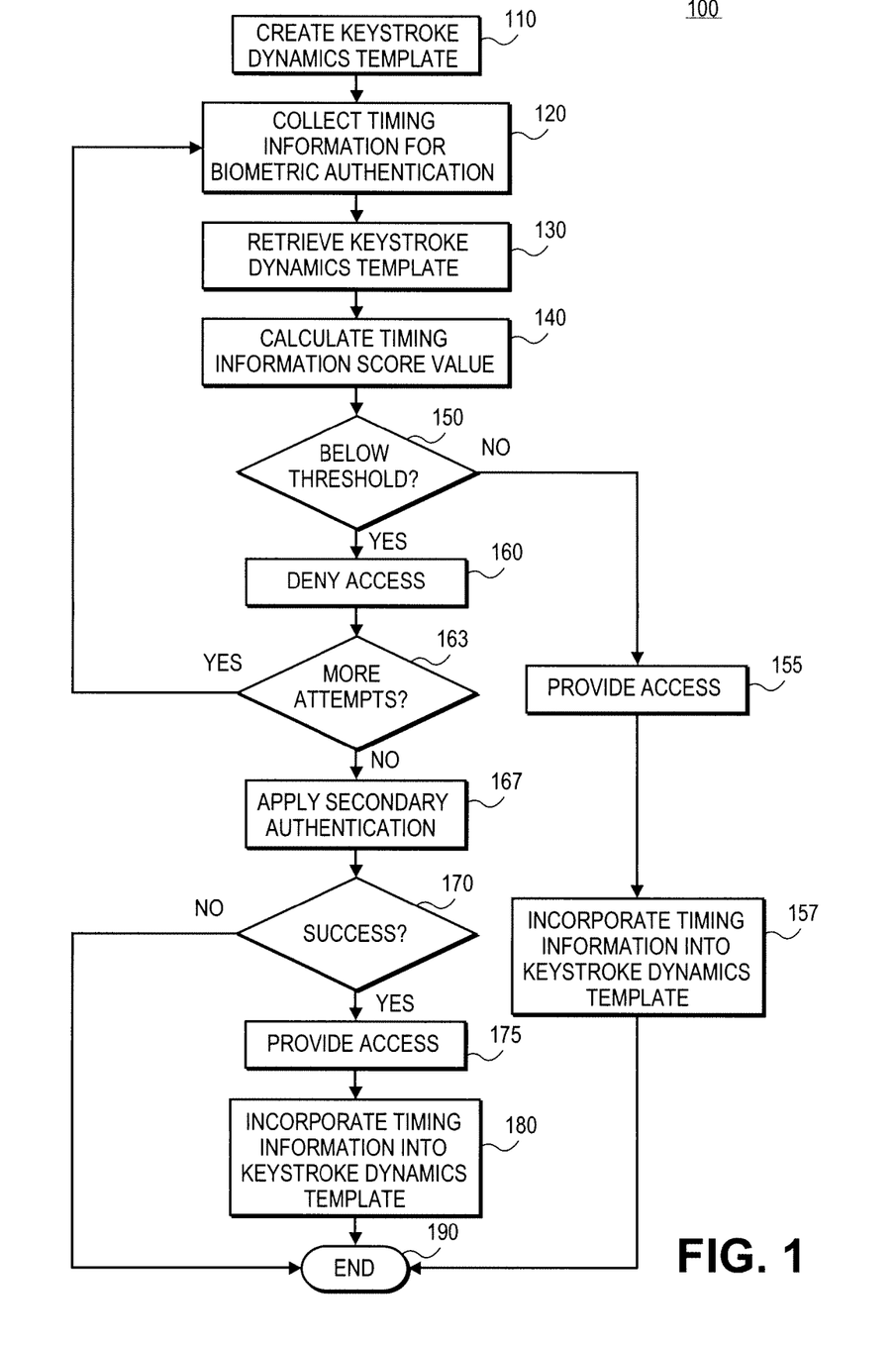
FIG. 1 is a diagram illustrating one embodiment of a process for authenticating and incorporating biometric data into a biometric template.

FIG. 1 illustrates one embodiment of a process 100 for incorporating data related to collected timing information of key-press and key release events into a biometric template. The terms "collected samples," "input samples" or "samples" will be used interchangeably herein to refer to the collected timing information from the user's input. In block 110, a keystroke dynamics template is created. The template is created after completing a process called enrollment that collects user input samples based on key-press and key release event data of a phrase entered by the user on a keyboard. For example, during enrollment, a user may type in and a computer system may receive (e.g., collect) numerous samples (e.g., attempts to type all the characters of the phrase) of a phrase such as a user ID and/or a pass phrase (e.g., a "password") on a keyboard as part of an enrollment process. A biometric template is then created having thresholds for various features of the phrase statistically calculated based on the collected keystroke timing data of the samples. The template may be used to identify the user's biometric measurements or typing style for the typed phrase. The template may represent or identify the user's typing rhythm based on timing data measuring features for some or all of the samples of the phrase.

In block 120, timing information of key-press and key-release events detected during keyboard (or similar input device) entry of a phrase is collected during a current user session. Used herein, a session may refer to an instance when a user is attempting to be authenticated by entering the phrase using the keyboard or similar input device. Although in one embodiment, a keyboard is described for entry of the phrase, this description is exemplary and the user may use another input device capable of entry of the phrase such as (but not strictly limited to) a touch pad, wireless keyboard, BLUETOOTH keyboard, personal digital assistant, or mobile cell phone. In one embodiment, the phrase may include a user ID and password. The key-press and key-release events that are collected may also include data related to key dwell times and key flight times. Key dwell time is the amount of time that the user holds down a particular key before releasing the key. Key flight time is the time between releasing a key before pressing down on the same or another key. The collected samples from the user will be used to authenticate the user based on data in the template.

In block 130, a keystroke dynamics template ("template") from data including previously measured key-press and key-release times is retrieved. The previously measured key-press and key-release times were collected during the enrollment process to construct the template. In other words, the data in the keystroke dynamics template was collected during other user sessions at previous times from the current user session. In one embodiment, the template is a structured set of numbers which describes the user's typing rhythm. In one embodiment, a template comprises a center vector and a variability vector. The center vector includes values that describe the user's typical values related to typing rhythm. The variability vector includes values that describe the point-wise consistency of the user for indicating the degree in which the input samples from the raw timing data values can be varied. In one embodiment, the center vector is the average of the input sample vectors from previous user input data and the variability vector is the standard deviation of the input sample vectors.

In block 140, a score value is calculated by comparing each value in the timing information of key-press and key-release events with a corresponding range of values from the keystroke dynamics template. As part of the authentication process based on the user's biometric data, the collected samples are processed to determine the degree in which their values fall within the values in the template vectors. In one embodiment, a multi-distance scoring system may be used to calculate the timing information score value. For example, a score can be calculated for each band in the template and then a weighted sum (representing the score value) can be obtained based on the scores of each band. In one embodiment, a band may be defined by the following equation:

$$\text{band} = (\text{templateCenter} \pm c^* \text{ template Variability}) \quad \text{(EQ1)}$$

where c is a constant.

In this manner, the timing information score value can be obtained for the collected samples based on the values in the template.

In block 150, the score value may be compared with a threshold value to determine whether the score value is below the threshold value. In block 160, access to a resource may be denied if the score value is below a threshold value. The resource may include, but is not limited to, data, documents, E-mail, an operating system, or a computer system that requires authentication before granting access. In block 155, access to the resource may be provided if the score value is above or equal to the threshold value. Upon a successful authentication, the timing information is then incorporated into the keystroke dynamics template at block 157. Finally, the process may end at block 190.

In an instance where authentication using the keystroke dynamics template has failed, then access to the resource is denied. In block 160, access to the resource may be denied if the score value is below the threshold value. In one embodiment, upon denial of access to the resource, the authentication process may end at block 190 without further processing. In another embodiment, the process may determine whether a predetermined number of authentication attempts has been met at block 163. In this manner, the user may be provided another opportunity in a separate user session to authenticate based on the keystroke dynamics template. For example, the user may be given three opportunities to authenticate based on the template. In the event that authentication fails repeatedly during the allotted amount of authentication attempts, then access to the resource may be denied at block 160. In the event that the biometric authentication initially fails based on the template and then the user successfully authenticates at block 150 in a subsequent attempt, both sets of timing information (i.e., the failed initial attempt and the successful subsequent attempt) may be incorporated into the keystroke dynamics template at block 157. Incorporating the timing information into the template following a successful non-biometric authentication is described in more detail below.

In some instances, the user may be denied access to the resource even when the user is the actual person associated with the template. This denial of access can be considered a type of statistical error called the False Reject Rate ("FRR"). FRR represents the occurrence of rejecting a user as an imposter when the user is a real user. Therefore, the process may provide an alternate authentication scheme not based on the biometric template to identify the user. In other words, the user may still be provided access to the resource upon successful authentication using the non-biometric authentication scheme. In block 167, a secondary authentication scheme may be applied to identify the user. For example, a secondary authentication scheme may include a non-biometric authentication process such as a one-time password or knowledge-based authentication. In block 170, if the secondary authentication process is not successful, then the authentication process may end at block 190. In block 180, if the secondary authentication process is successful at block 170, then the timing information from the collected user input samples may be incorporated into the keystroke dynamics template. In one embodiment, the collected timing information of key-press and key-release events are incorporated into the keystroke dynamics template in response to denying access to the resource based on the template followed by a successful authentication using the secondary non-biometric authentication scheme. Incorporating the timing information may be accomplished by adding values representing scalar quantities of the timing information to the vectors within the template. In this manner, errors associated with falsely rejecting the user are reduced during the authentication process and the template may be improved for future authentication of the user and FRR for the user may be reduced.

Figure 2:
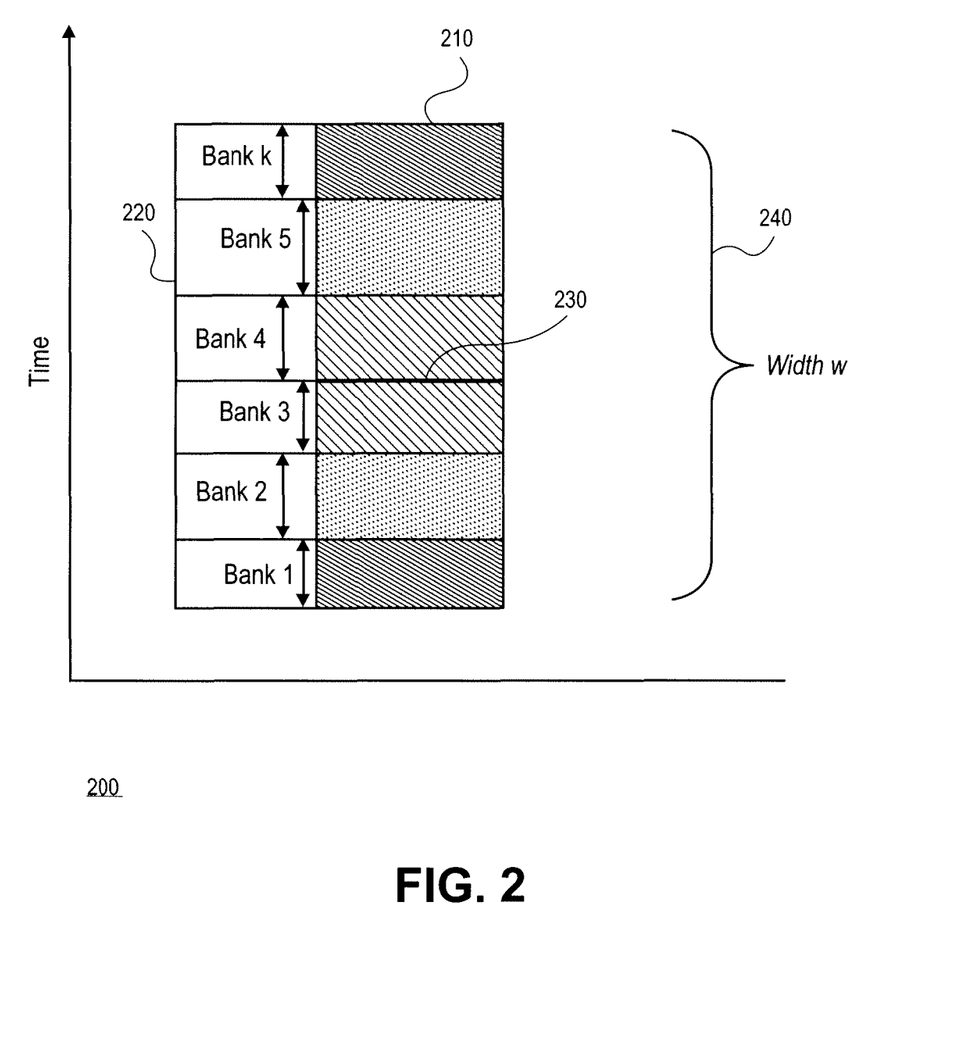
FIG. 2 is a diagram illustrating one embodiment of data in a biometric template.

FIG. 2 is a diagram illustrating one embodiment 200 of data in a biometric template. The data in the template 210 may be divided into a set of bands 220, wherein each band includes a respective range of values related to the data in the template. In one embodiment, each band may be determined using equation EQ1 as described above. For example, the data in the template may be from a range of values that is divided into k number of bands. As shown in FIG. 2, the range of values in the template may include a range of time. Although each band is shown to be discrete in FIG. 2, each band may also overlap with neighboring bands in an alternate embodiment. A center 230 in the template may represent a mean of the values in the template. A width 240 may represent a total range of values in the template. Incorporating more data in the template may change the value of center 230 and width 240 and will be described in more detail in FIG. 3.

Incorporating Collected Biometric Data Into the Biometric Template

Figure 3:
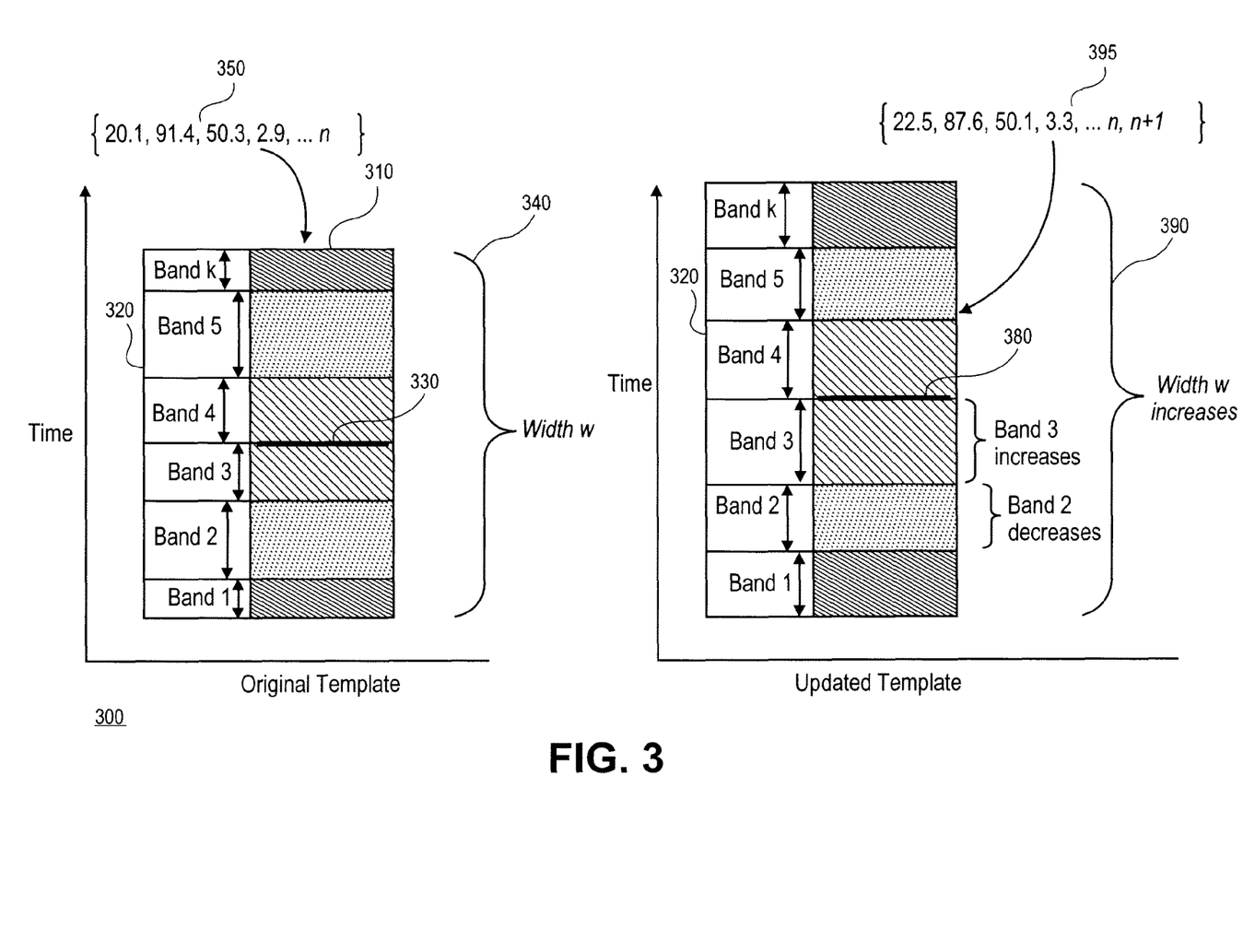
FIG. 3 is a diagram illustrating one embodiment of a process for incorporating collected user input samples into a biometric template.

FIG. 3 is an illustration of one embodiment of a process 300 for incorporating collected timing information during authentication of the user into the keystroke dynamics template. The collected timing information may be incorporated following a successful authentication using the keystroke dynamics template or using the second authentication scheme as described in FIG. 1. In the case when the user is successfully authenticated via the secondary authentication scheme, a false rejection of the user has occurred based on the template. A false rejection represents an occurrence of a failed authentication for the user because of inconsistencies in the user's typing rhythm or errors in the template. As an illustration of how a false rejection may occur, during enrollment, the user may be in a controlled environment that promotes the user to provide consistent user input samples. The controlled environment may include the same type of computer system with the same type of keyboard device. However, the user may be falsely rejected based user input samples of key timing information because of changes to this controlled environment that the template was based on. For example, the user may be at a remote location using a separate computer system than the one that was used during enrollment. This separate computer system may include a different type of keyboard device (e.g., wireless, BLUETOOTH, laptop, laptop in a docking station, or desktop) and may be located in the remote location away from the computer system containing the resource to be accessed. In other instances, the user may be using the identical computer system used during enrollment, but other factors contribute to the user being falsely rejected. These other factors include physiological changes (e.g., the user's nervous system may be impaired in some fashion or in an abnormal state) that introduce variations into the keystroke timing information collected from the user input. In another scenario, the user may have acquired a recent physical condition (e.g., a disability) that changes the user's input rhythm to the input device. Therefore, it is desirable to incorporate collected timings including the key timing information of the user into the template to account for the factors denoted above.

In one embodiment, the data in a template 310 may be divided into a set of bands 320, wherein each band (as determined using EQ1 above) includes a respective range of values related to the data in the template. A vector 350 may include n amount of scalar quantities in the template, where n represents the number of previous user input samples used to create the template. Following a successful authentication of the user using the biometric template or secondary authentication scheme as described above in FIG. 1, an additional value shown as n+1 may be incorporated into vector 350 to produce vector 395. In this manner, template 310 may be updated. This additional value may represent a scalar quantity based on the collected timing information of the user input samples during the current session. Although, in this example, an additional value n+1 is incorporated into vector 350 to produce vector 395, it should be understood that more values from the collected user input samples may be incorporated into the vectors of the template. Template 360 represents the updated template after incorporating the additional value or values. After the additional value or values are incorporated into the template, a center 380 in the template 360 may represent a mean of the values in vector 395. In this example, center 380 has shifted up when compared with center 330 in template 310. Although in this example center 380 has shifted up, the updated template can widen, stay the same or shrink depending on the sample (i.e., n+1) now incorporated into vector 395. A width 390 of template 360 may represent a total range of values with the additional values now incorporated in the template. In this example, width 390 of template 360 has increased in comparison with width 340 of template 310. Also shown in FIG. 3, after the template has been updated, band 3 of template 360 has increased when compared to band 3 of template 310. Moreover, band 2 of template 360 has decreased in comparison with band 2 of template 310. Again, the changes in bands 370 illustrated in FIG. 3 are representative in nature and in other instances the template 360 may widen, stay the same or shrink depending on the additional values now incorporated into vector 395. Incorporating collected timings results in a modification of these vectors in the template and may then be used for subsequent authentication of the user. In this manner, the quality of template may be improved to include key timing information in instances where the user is attempting to access the resource using a different environment (e.g., different keyboard) or different physiological condition (e.g., disability) than the one during the enrollment process. Consequently, the instances of false rejections may be reduced for the user.

After updating the template, the input samples in the template now include enrollment samples and authentication samples that are part of a successful authentication attempt using a biometric or a secondary authentication scheme. Because a user's typing rhythm is an evolving one, weighting the most recently submitted samples more than the older samples allows the template to be more adaptive to that evolving rhythm. In one embodiment, the weighting mechanism is constructed as follows. Each sample $S_i$ is assigned a weight that reflects a time $W_i$ that it was submitted. Since the more recent samples are favored, this means that $W_2 > W_1$ if $S_1$ is submitted prior to $S_2$.

The template may then be created and be updated using a weighted average/mean for a center C and weighted standard deviation for a variability V. Since $S_i$, C and V are all vectors, the equations may be written in a point-wise manner:

$$C_j = \frac{\Sigma_i\{S_{i,j} * W_i\}}{\Sigma_i W_i} \quad \text{(EQ2)}$$

$$V_j = \sqrt{\frac{\Sigma_i\{W_i * (S_{i,j} - C_j)^2\} * \Sigma_i W_i}{\{\Sigma_i W_i\}^2 - \Sigma_i\{W_i\}^2}} \quad \text{(EQ3)}$$

where in equations EQ2 and EQ3, $S_{i,j}$ is the $j^{th}$ point in the $i^{th}$ Sample vector, $W_i$ is the weight associated with the $i^{th}$ Sample, $C_j$ is the $j^{th}$ point of the Template Center vector, and $V_j$ is the $j^{th}$ point of the Template Variability vector.

Figure 4:
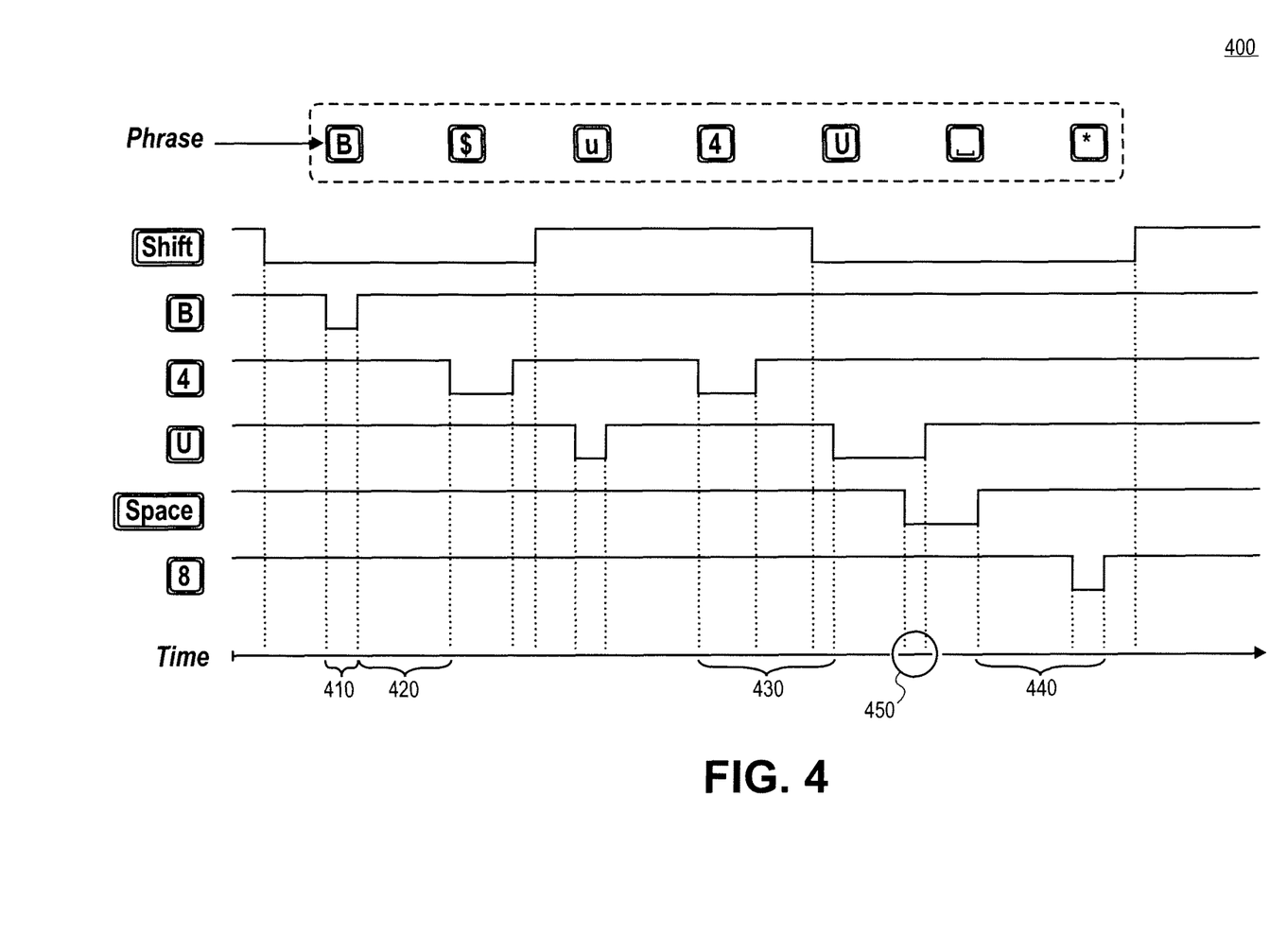
FIG. 4 is a diagram illustrating one embodiment of timing information collected from the keyboard activity of a user.

FIG. 4 is an illustration of timing information 400 collected from the keyboard activity of a user. A graphical depiction of possible time periods for a phrase and the corresponding keyboard activity that may occur during typing of the phrase is shown. One simple, useful datum that can be computed from the raw keystroke timing data is the length of time a key is depressed 410, the "dwell time." Another useful measure is the time from the release of one key to the depression of the next 420, called the "flight time." Dwell and flight times can efficiently represent all of the key events that occur during the typing of a phrase. Note that flight time may be negative, as shown at 450: the 'U' key was not released until after the "Space" key was pressed, so the "U*Space" flight time is negative.

Other derived measures could also be used by an embodiment. For example, the key-press-to-subsequent-key-press time 430, or key-release-to-subsequent-key-release time 440 also permit the events that occurred during the typing of the phrase to be represented in a useful way. Some embodiments may compute key press and release times relative to the key press event that starts the entry of the phrase, or the key press (or release) event that ends entry of the phrase.

In one embodiment, data related to dwell times, flight times, and other derived measures as shown in FIG. 4 may be incorporated into the template to improve quality of the template after a denial of access to a resource.

Figure 5:
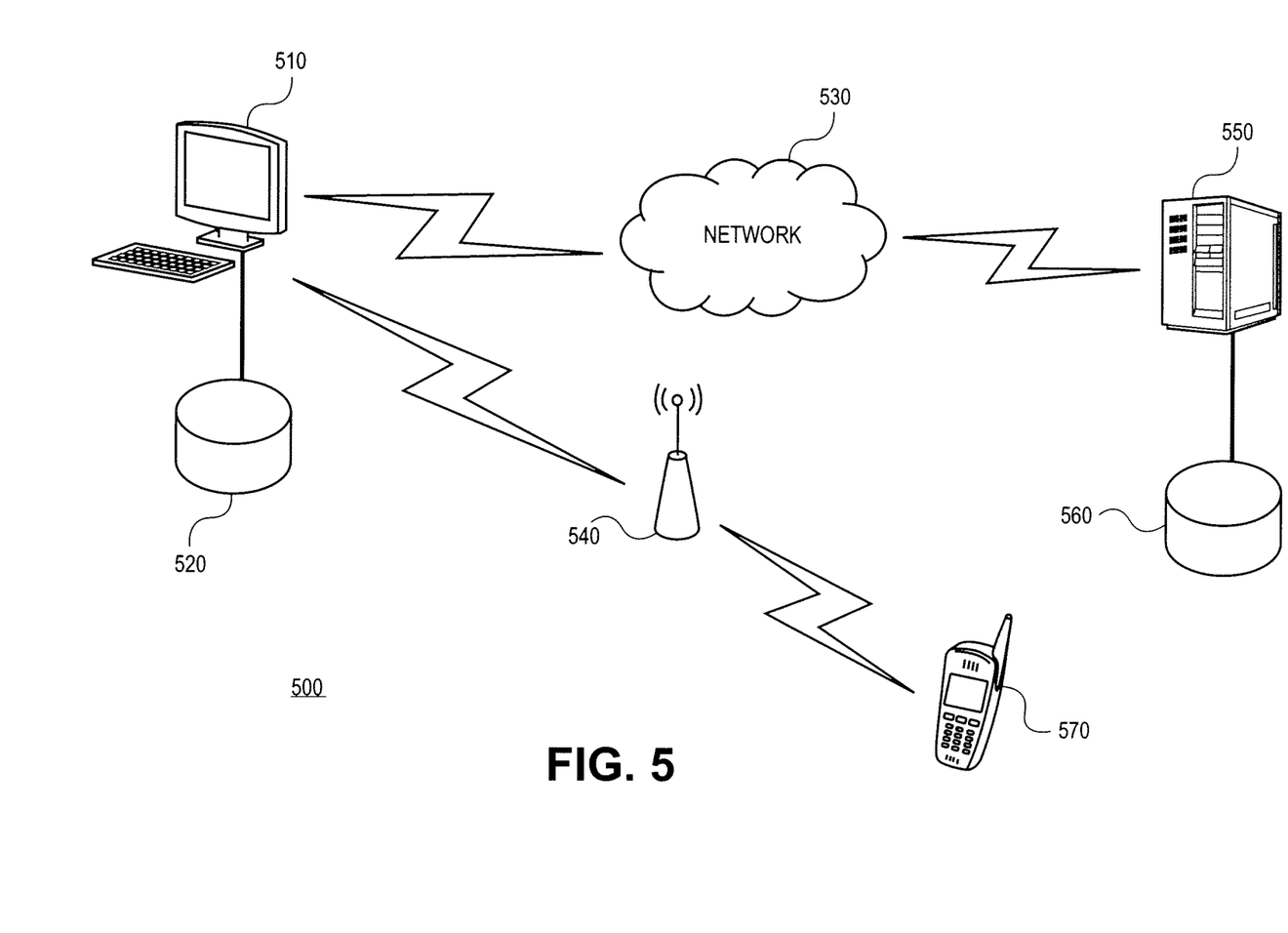
FIG. 5 is a diagram illustrating one embodiment of a system for authenticating a user based on a biometric template.

FIG. 5 is an illustration of a system 500 that implements processes 100, 200, and 300 as discussed in FIGS. 1-3 for authenticating a user based on collected biometric data in comparison with a biometric template. A user may be authenticated using a keyboard device on computer system 510. Although the user may use a keyboard device in this embodiment, in an alternate embodiment any suitable input device including a touch pad, touch screen, or tablet PC may be used. Computer system 510 may also include a processor for executing operations related to the authentication process, a communication device for interfacing with server 550 over network 530 and wireless device 570 over wireless access point 540, and storage device 520 that contains the executable instructions that comprise the authentication process. Storage device 520 may also contain a resource that the user is accessing that requires authentication. In one embodiment, computer system 510 may communicate with wireless device 570 to exchange information related to the authentication process. In one embodiment, server 550 includes a communication device to interface with computer system 510 over network 530. Server 550 may also store a resource on storage device 560 that is accessed by the user with computer system 510.

The processes described herein may be a machine-readable medium having stored thereon data and instructions to cause a programmable processor to perform operations as described above. In other embodiments, the operations might be performed by specific hardware components that contain hard-wired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required process steps. The required structure for a variety of these systems will appear from the description below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that improved keystroke dynamic authentication can also be achieved by software and hardware that distribute the functions of embodiments of this invention differently than herein described. Such variations and implementations are understood to be captured according to the following claims.

What is claimed is:

1. A method comprising:
    denying access to a resource in response to a score value of a legitimate user, based on timing information of key-press and key-release events entered by the legitimate user being below a threshold value of a keystroke dynamics template of the legitimate user, wherein the events are presses and releases of keys of a keyboard by one person; then
    as a result of denying, identifying the key-press and key-release events entered by the legitimate user as key-press and key-release events entered by an imposter; then
    as a result of denying, applying a non-biometric secondary type of authentication after denying access to the resource based on the score value; then
    as a result of applying, granting access to the resource based only on the non-biometric secondary type of authentication authenticating the legitimate user; and then
    incorporating the timing information of key-press and key-release events entered by the legitimate user and identified as key-press and key-release events entered by an imposter, into the keystroke dynamics template of the legitimate user after denying access to the resource.

2. The method of claim 1 further comprising:
    collecting previously measured timing information of key-press and key-release events detected during keyboard entry of a phrase entered by the legitimate user during another user session, prior to denying; and
    wherein the keystroke dynamics template includes the previously measured timing information of key-press and key-release events entered by the legitimate user, and the timing information of key-press and key-release events identified as key-press and key-release events entered by an imposter.

3. The method of claim 1, wherein the incorporated timing information of key-press and keyrelease events includes data representing key dwell times and key flight times.

4. The method of claim 1, wherein incorporating the timing information of key-press and keyrelease events mitigates a false reject rate for a user, the false reject rate for indicating an amount of erroneous denial of access for the keystroke dynamics template.

5. The method of claim 1, wherein incorporating the timing information of key-press and key-release events into the keystroke dynamics template comprises:
including the timing information into a vector containing scalar quantities corresponding to collected timing information of key-press and key-release events entered by the legitimate user and identified as key-press and key-release events entered by an imposter.

6. The method of claim 5, further comprising:
calculating a mean value from the included timing information and other scalar quantities in the vector; and
calculating a standard deviation based on the mean value.

7. A method comprising:
collecting timing information of key-press and key-release events detected during keyboard entry of a phrase by a legitimate user;
retrieving a keystroke dynamics template of the legitimate user, the template formed from data including previously measured keypress and key-release times for the user during another user session;
calculating a score value of the legitimate user based on a comparison of the collected timing information of key-press and key-release events with the keystroke dynamics template;
denying access to a resource in response to the score value being below a threshold value related to the template;
applying a non-biometric secondary type of authentication to identify the user after denying access in response to the score value; and
incorporating the timing information of key-press and key-release events entered by the legitimate user and identified as key-press and key-release events entered by an imposter, into the keystroke dynamics template of the legitimate user after denying access to the resource.

8. The method of claim 7, wherein denying access to the resource is an indicator of the timing information of key-press and key-release events failing authentication based on the keystroke dynamics template.

9. The method of claim 7, wherein applying the secondary type of authentication occurs after a predetermined number of attempts of authentication based on the keystroke dynamics template.

10. The method of claim 7, wherein incorporating the timing information occurs alter a false reject for a user.

11. The method of claim 10, wherein the false reject is an occurrence of erroneous denial of access of the user.

12. A non-transitory computer-readable medium storing data and instructions to cause a programmable processor to perform operations comprising:
denying access to a resource in response to a score value of a legitimate user, based on timing information of key-press and key-release events entered by the legitimate user being below a threshold value of a keystroke dynamics template of the legitimate user, wherein the events are presses and releases of keys of a keyboard by one person; then
as a result of denying, identifying the key-press and key-release events entered by the legitimate user as key-press and key-release events entered by an imposter; then
as a result of denying, applying a non-biometric secondary type of authentication after denying access to the resource based on the score value; then
as a result of applying, granting access to the resource based only on the non-biometric secondary type of authentication authenticating the legitimate user; and then
incorporating the timing information of key-press and key-release events entered by the legitimate user and identified key-press and key-release events entered by an imposter, into the keystroke dynamics template of the legitimate user after denying access to the resource.

13. The computer-readable medium of claim 12, including further operations comprising:
collecting previously measured timing information of key-press and key-release events detected during keyboard entry of a phrase entered by the legitimate user during another user session, prior to denying; and
wherein the keystroke dynamics template includes the previously measured timing information of key-press and key-release events entered by the legitimate user, and the timing information of key-press and key-release events identified as key-press and key-release events entered by an imposter.

14. The computer-readable medium of claim 12, wherein the incorporated timing information of key-press and key-release events includes data representing key dwell times and key flight times.

15. The computer-readable medium of claim 12, wherein incorporating the timing information of key-press and key-release events mitigates a false reject rate for a user, the false reject rate for indicating an amount of errroneous denial of access of the user corresponding to the keystroke dynamics template.

16. The computer-readable medium of claim 12, wherein incorporating the timing information of key-press and key-release events into the keystroke dynamics template comprises:
including the timing information into a vector containing scalar quantities corresponding to collect timing information of key-press and key-release events entered by the legitimate user and identified as key-press and key-release events entered by an imposter.

17. The computer-readable medium of claim 16 including further operations comprising:
calculating a mean value from the included timing information and other scalar quantities in the vector; and
calculating a standard deviation based on the mean value.

18. The method of claim 1, wherein the non-biometric secondary type of authentication comprises a one-time password or a knowledge-based authentication;
wherein the legitimate user and the imposter are the one person;
wherein the timing information of key-press and key-release events entered by the legitimate user are detected during keyboard entry of a phrase entered by the legitimate user; and
wherein the non-biometric secondary type of authentication authenticating the legitimate user is not based on the phrases.

19. The method of claim 7, wherein the non-biometric secondary type of authentication comprises a one-time password or a knowledge-based authentication;
wherein the legitimate user and the imposter are the one person;
wherein the timing information of key-press and key-release events entered by the legitimate user are detected during keyboard entry of a phrase entered by the legitimate user; and wherein the non-biometric secondary type of authentication authenticating the legitimate user is not based on the phrases.

20. The computer-readable medium of the claim 12, wherein the non-biometric secondary type of authentication comprises a one-time password or a knowledge-based authentication;
    wherein the legitimate user and the imposter are the one person;
    wherein the timing information of key-press and key-release events entered by the legitimate user are detected during keyboard entry of a phrase entered by the legitimate user; and
    wherein the non-biometric secondary type of authentication authenticating the legitimate user is not based on the phrases.

21. The method of claim 1, wherein the non-biometric secondary type of authentication comprises a one-time password or a knowledge-based authentication;
    wherein granting access to the resource based only on the non-biometric secondary type of authentication authenticating the legitimate user includes granting access to the resource regardless of the timing information of key-press and key-release events entered by the legitimate user; and
    wherein incorporating includes combining the timing information of key-press and key-release events entered by the legitimate user and identified as key-press and key-release events entered by an imposter, into the keystroke dynamics template of the legitimate user.

22. The method of claim 7, wherein the non-biometric secondary type of authentication comprises a one-time password or a knowledge-based authentication;
    wherein granting access to the resource based only on the non-biometric secondary type of authentication authenticating the legitimate user includes granting access to the resource regardless of the timing information of key-press and key-release events entered by the legitimate user; and
    wherein incorporating includes combining the timing information of key-press and key-release events entered by the legitimate user and identified as key-press and key-release events entered by an imposter, into the keystroke dynamics template of the legitimate user.

23. The computer-readable medium of claim 12, wherein the non-biometric secondary type of authentication comprises a one-time password or a knowledge-based authentication;
    wherein granting access to the resource based only on the non-biometric secondary type of authentication authenticating the legitimate user includes granting access to the resource regardless of the timing information of key-press and key-release events entered by the legitimate user; and
    wherein incorporating includes combining the timing information of key-press and key-release events entered by the legitimate user and identified as key-press and key-release events entered by an imposter, into the keystroke dynamics template of the legitimate user.

* * * * *